United States Patent
Learned

(10) Patent No.: US 11,632,764 B1
(45) Date of Patent: Apr. 18, 2023

(54) MULTI-ANTENNA SEQUENTIAL INTERFERENCE CANCELLING RECEIVER

(71) Applicant: Massachusetts Institute of Technology, Cambridge, MA (US)

(72) Inventor: Rachel E. Learned, Waltham, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 85 days.

(21) Appl. No.: 16/880,377

(22) Filed: May 21, 2020

Related U.S. Application Data

(60) Provisional application No. 62/850,730, filed on May 21, 2019.

(51) Int. Cl.
*H04W 72/08* (2009.01)
*H04B 7/08* (2006.01)
*H04J 11/00* (2006.01)

(52) U.S. Cl.
CPC .......... *H04W 72/082* (2013.01); *H04B 7/086* (2013.01); *H04J 11/0036* (2013.01)

(58) Field of Classification Search
CPC ...... H04B 1/10; H04B 1/1027; H04B 1/1036; H04B 1/109; H04B 1/123; H04B 7/086; H04B 1/126; H04B 1/12; H04B 7/0617; H04B 7/0413; H04B 7/043; H04B 7/0456; H04B 7/0408; H04B 7/0634; H04B 17/21; H04B 7/088; H04B 7/0857; H04B 1/7113; H04B 1/7117; H04B 7/00; H04B 7/0469; H04B 7/0874; H04B 7/1555;
(Continued)

(56) References Cited

U.S. PATENT DOCUMENTS 6,018,317 A 1/2000 Dogan et al.
6,487,414 B1 11/2002 Tanay et al.
(Continued)

FOREIGN PATENT DOCUMENTS

WO WO 2010/066289 A1 6/2010
WO WO 2011/006116 A1 1/2011
(Continued)

OTHER PUBLICATIONS

Ahmed, et al.; "Entropy Expressions and Their Estimators for Multivariate Distributions;" IEEE Transactions on Information Theory; vol. 35; No. 3; May 1989; 5 pages.
(Continued)

*Primary Examiner* — Lana N Le
(74) *Attorney, Agent, or Firm* — Daly, Crowley, Mofford & Durkee, LLP

(57) ABSTRACT

In some embodiments, a method for mitigating interference in a channel having multiple users includes: receiving a plurality of signals from a plurality of antenna elements, the received signals comprised of one or more interfering signals and a signal of interest (SOI); for each of the one or more interfering signals, beamforming the received signals to enhance the interfering signal, generating an estimate of the interfering signal, and adjusting the estimated interfering signal to undo the effects of beamforming; and subtracting each of the estimated interfering signals from each of the received signals to generate a plurality of interference-mitigated received signals.

10 Claims, 8 Drawing Sheets

(58) Field of Classification Search
CPC . H04B 7/15585; H04B 17/12; H04W 72/082; H04J 11/0036

See application file for complete search history.

(56) References Cited

U.S. PATENT DOCUMENTS

| | | | |
|---|---|---|---|
| 6,701,129 B1 | 3/2004 | Hashem et al. | |
| 6,704,376 B2 | 3/2004 | Mills et al. | |
| 6,947,505 B2 | 9/2005 | Learned | |
| 7,031,266 B1 | 4/2006 | Patel et al. | |
| 7,058,422 B2 | 6/2006 | Learned et al. | |
| 7,085,575 B2 | 8/2006 | Fabien et al. | |
| 7,092,452 B2 | 8/2006 | Taylor et al. | |
| 7,126,533 B2 | 10/2006 | Fiore et al. | |
| 7,126,890 B2 | 10/2006 | Learned et al. | |
| 7,190,743 B2 | 3/2007 | Learned | |
| 7,218,690 B2 | 5/2007 | Learned | |
| 7,269,223 B2 | 9/2007 | Learned et al. | |
| 7,558,238 B1 | 7/2009 | Sun et al. | |
| 7,593,473 B2 | 9/2009 | Learned et al. | |
| 7,593,492 B1 | 9/2009 | Lande et al. | |
| 7,724,851 B2 | 5/2010 | Learned et al. | |
| 7,738,906 B2 | 6/2010 | Attar et al. | |
| 9,148,804 B2 | 9/2015 | Learned | |
| 9,998,199 B2 | 6/2018 | Learned et al. | |
| 10,091,798 B2 | 10/2018 | Learned et al. | |
| 10,225,112 B1* | 3/2019 | Doane | H04L 25/03343 |
| 11,005,507 B2* | 5/2021 | Dowling | H04B 7/086 |
| 11,194,005 B2 | 12/2021 | Reisenfeld et al. | |
| 2001/0028675 A1 | 10/2001 | Bierly et al. | |
| 2002/0002052 A1 | 1/2002 | McHenry | |
| 2002/0122413 A1 | 9/2002 | Shoemake | |
| 2002/0181637 A1 | 12/2002 | Nakabayashi | |
| 2003/0043071 A1* | 3/2003 | Lilly | H01Q 3/2605 |
| | | | 342/368 |
| 2004/0018843 A1 | 1/2004 | Cerwall et al. | |
| 2004/0082363 A1 | 4/2004 | Hosein | |
| 2004/0235472 A1 | 11/2004 | Fujishima et al. | |
| 2005/0124347 A1 | 6/2005 | Hosein | |
| 2005/0201280 A1 | 9/2005 | Lundby et al. | |
| 2007/0086379 A1 | 4/2007 | Takayanagi et al. | |
| 2008/0075037 A1* | 3/2008 | Guo | H04W 72/082 |
| | | | 370/329 |
| 2008/0089279 A1 | 4/2008 | Hu et al. | |
| 2008/0198828 A1 | 8/2008 | Reznik et al. | |
| 2008/0293353 A1 | 11/2008 | Mody et al. | |
| 2009/0154534 A1 | 6/2009 | Hassan | |
| 2009/0190566 A1 | 7/2009 | Kwon et al. | |
| 2009/0258597 A1 | 10/2009 | Chen et al. | |
| 2010/0034107 A1* | 2/2010 | Chin | H04W 72/082 |
| | | | 370/252 |
| 2010/0124930 A1 | 5/2010 | Andrews et al. | |
| 2010/0142465 A1 | 6/2010 | Medepalli et al. | |
| 2010/0165956 A1 | 7/2010 | Razzell | |
| 2010/0289688 A1 | 11/2010 | Sherman et al. | |
| 2010/0304770 A1 | 12/2010 | Wietfeldt et al. | |
| 2011/0021153 A1* | 1/2011 | Safavi | H04J 11/0023 |
| | | | 455/63.1 |
| 2011/0093540 A1 | 4/2011 | Eisenberg et al. | |
| 2011/0176508 A1 | 7/2011 | Altintas et al. | |
| 2011/0286351 A1 | 11/2011 | Reudink | |
| 2012/0039183 A1 | 2/2012 | Barbieri et al. | |
| 2012/0069941 A1 | 3/2012 | Herbig | |
| 2012/0071102 A1 | 3/2012 | Palomar et al. | |
| 2012/0108276 A1 | 5/2012 | Lang et al. | |
| 2012/0208571 A1 | 8/2012 | Park et al. | |
| 2013/0035108 A1 | 2/2013 | Joslyn et al. | |
| 2013/0089021 A1* | 4/2013 | Gaal | H04B 7/155 |
| | | | 370/315 |
| 2013/0244681 A1 | 9/2013 | Ookubo et al. | |
| 2014/0126488 A1 | 5/2014 | Learned | |
| 2014/0293867 A1 | 10/2014 | Horiuchi et al. | |
| 2014/0314003 A1 | 10/2014 | Zhou et al. | |
| 2014/0348004 A1 | 11/2014 | Ponnuswamy | |
| 2015/0049721 A1 | 2/2015 | Wijting et al. | |
| 2015/0089048 A1 | 3/2015 | Jackson et al. | |
| 2015/0236761 A1* | 8/2015 | Schwager | H04B 7/0456 |
| | | | 375/267 |
| 2015/0282176 A1 | 10/2015 | MacLeod et al. | |
| 2015/0282189 A1 | 10/2015 | Learned et al. | |
| 2017/0026205 A1* | 1/2017 | Agee | H04B 7/0617 |
| 2018/0219587 A1* | 8/2018 | Huo | H04B 7/0413 |
| 2018/0309502 A1* | 10/2018 | Khandani | H04B 7/15578 |
| 2019/0075438 A1 | 3/2019 | Kuo et al. | |
| 2019/0222296 A1* | 7/2019 | Khandani | H04B 7/086 |
| 2020/0336168 A1* | 10/2020 | Hormis | H03L 7/22 |
| 2020/0395686 A1* | 12/2020 | Jamin | H01Q 5/28 |

FOREIGN PATENT DOCUMENTS

| | | |
|---|---|---|
| WO | WO 2011/055319 A1 | 5/2011 |
| WO | WO 2013/185150 A1 | 12/2013 |
| WO | WO 2014/052992 A1 | 4/2014 |
| WO | WO 2016/053406 A1 | 4/2016 |
| WO | WO 2016/053406 A9 | 4/2016 |
| WO | WO 2016/114844 A2 | 7/2016 |

OTHER PUBLICATIONS

Bahl, et al.; "Optimal Decoding of Linear Codes for Minimizing Symbol Error Rate;" IEEE Transactions on Information Theory; Mar. 1974; 4 pages.

Learned; "Making Optimal Use of the Asymmetric Inference Channel;" IEEE; Signals, Systems and Computers (Asilomar); Nov. 6-9, 2011; 6 pages.

Learned; "Making Optimal Use of the Asymmetric Interference Channel;" Asilomar Conference on Signals, Systems, and Computing; Presentation; Nov. 8, 2011; 63 pages.

Neeser, et al.; "Proper Complex Random Processes with Applications to Information Theory;" IEEE Transactions on Information Theory; vol. 39; No. 4; Jul. 1993; 10 pages.

Pham; "Fast Algorithms for Mutual Information Based Independent Component Analysis;" IEEE Transactions on Signal Processing; vol. 52; No. 10; Oct. 2004; 11 pages.

Tufts; "Design Problems in Pulse Transmission;" Technical Report 368; Massachusetts Institute of Technology; Jul. 28, 1960; 52 pages.

Tufts; "Nyquist's Problem—The Joint Optimization of Transmitter and Receiver in Pulse Amplitude Modulation;" Proceedings of the IEEE: vol. 53; Issue 3; 12 pages.

Ungerboeck; "Channel Coding with Multilevel/Phase Signals;" IEEE Transactions on Information Theory; vol. IT-28; No. 1; Jan. 1982; 13 pages.

Verdu; "The Capacity Region of the Symbol-Asynchronous Gaussian Multiple-Access Chanel;" IEEE Transactions on Information Theory; vol. 35; No. 4; Jul. 1989; 19 pages.

U.S. Appl. No. 16/900,116, filed Jun. 12, 2020, Dowling.

U.S. Appl. No. 16/880,410, filed May 21, 2020, Learned.

U.S. Appl. No. 16/880,370, filed May 21, 2020, Learned.

Notice of Allowance dated Jan. 11, 2021 for U.S. Appl. No. 16/900,116; 15 pages.

Chaouech et al. "Multiuser Detection in Asynchronous Multibeam Communications" International Journal of Wireless and Mobile Networks (IJWMN) vol. 4, No. 1; Feb. 2012; 14 Pages.

Non-Final Office Action dated Mar. 31, 2022 for U.S. Appl. No. 16/880,370; 12 Pages.

U.S. Final Office Action dated Sep. 28, 2022 for U.S. Appl. No. 16/880,370; 16 pages.

Non-Final Office Action dated Aug. 25, 2022, for U.S. Appl. No. 16/880,410; 9 Pages.

Response to U.S. Office Action dated Aug. 25, 2022 for U.S. Appl. No. 16/880,410; Response filed Nov. 21, 2022; 12 pages.

Response to U.S. Office Action dated Sep. 28, 2022 for U.S. Appl. No. 16/880,370; Response filed Dec. 9, 2022; 9 pages.

Request for Consideration Under The After Final Consideration Pilot Program 2.0 for U.S. Appl. No. 16/880,370, filed Dec. 9, 2022; 2 pages.

U.S. Notice of Allowance dated Feb. 17, 2023 for U.S. Appl. No. 16/880,410; 11 pages.

(56) References Cited

OTHER PUBLICATIONS

U.S. Notice of Allowance dated Feb. 16, 2023 for U.S. Appl. No. 16/880,370; 12 pages.

* cited by examiner

MULTI-ANTENNA SEQUENTIAL INTERFERENCE CANCELLING RECEIVER

CROSS-REFERENCE TO RELATED APPLICATIONS

This application claims the benefit under 35 U.S.C. § 119 of provisional patent application No. 62/850,730 filed May 21, 2019, which is hereby incorporated by reference herein in its entirety.

STATEMENT REGARDING FEDERALLY SPONSORED RESEARCH

This invention was made with government support under FA8702-15-D-0001 awarded by the U.S. Air Force. The government has certain rights in the invention.

FIELD

The disclosure pertains generally to wireless communication, and more particularly to cognitive radio systems and techniques for achieving ad hoc wireless communications in the presence of other user interference (sometime referred to herein as "interference multiple access wireless communications").

BACKGROUND

As is known in the art, different wireless networks and/or systems of radios avoid interfering with each other by various options. For example, some systems rely on pre-arrangement or careful assignment of frequency bands, time slots, or signature pulses as is done for cellular systems through frequency reuse maps and TDMA for GSM, OFDMA for LTE, spread spectrum for IS-95, and combinations of these for WCDMA through HSPA commercial cellular standards. Other systems utilize collision avoidance techniques such as those employed for a packet based systems such as 802.11/16/22 (WiFi and WiMax) where collisions are controlled as part of a multiple access medium access control procedure (E.g. carrier sense multiple access). Still other systems utilize techniques for "on the fly" interference assessment and avoidance, such as dynamic spectrum access (DSA). This is done by the system of "secondary user" radios actively sensing the radio spectrum and coordinating to choose an empty band for transmission. Existing systems, however, fail if they are unable to avoid interference.

As the consumer market continues to rise for smart phones and wireless data service, the demand for more and more throughput increases and the radio spectrum becomes more crowded. A new paradigm in wireless communication is emerging where radios can be built to withstand interference to the level where interference is no longer avoided. Interference is allowed, even invited, to allow for more wireless devices to make use of the wireless spectrum. For example, the LTE Advanced standard (to support the HetNet feature) allows, even encourages, interference. If this new feature is enabled, reliable performance would require mobiles to have some kind of interference mitigation in the receivers.

Conventional cognitive networks adapt at a network/routing layer, not the physical layer. Such networks typically learn which network nodes are having trouble sending packets through them and then they start to change how they route the packets. This conventional type of cognitive network does not invite or encourage interference; it simply does the best it can to avoid using links that are hindered by interference. The subject of this disclosure, in contrast, purposely seeks out opportunities to create interference, but to do so in an intelligent way that takes advantage of the situation and device protocols and capabilities at hand along with making use of advanced processing and sensing technology so as to enable high throughputs for its own link as well as the link with which it simultaneously shares the band.

As may be understood from U.S. Pat. No. 10,091,798, to Learned and Kaminski, multiuser detection (MUD) on a channel may be performed using sequential/successive interference cancellation (SIC). A SIC MUD receiver estimates received signal parameters for an interfering signal, such as received amplitude, carrier frequency, phase, and baud timing. The receiver then demodulates the interfering signal, recreates it using the estimated parameters and demodulated symbol weights, and subtracts it from the received signal to reveal the signal of interest (SOI) underneath. This "cleaned up" received signal is then passed to a legacy receiver that works well in the absence of co-channel (same band) interference. U.S. Pat. No. 9,998,199, to Learned and Fiore, describe structures and techniques for use with MUD receivers including SIC MUD receivers. Both U.S. Pat. Nos. 10,091,798 and 9,998,199 are hereby incorporated by reference herein in their entireties.

Many existing solutions to reduce signal interference, including many MUD-based solutions, rely on the use of a spread spectrum technique such as direct-sequence spread spectrum (DSSS).

SUMMARY

As used herein, the phrases "co-existence cognitive radio" and "cognitive co-existence radio" generally refer to an intelligent wireless communication system that is aware of its surrounding environment (i.e., outside world), senses the RF environment to which it is exposed, computes feature parameters from sensed RF signals, makes decisions based upon calculations involving the RF features along with learned features acquired from gained understanding of the environment's behavior in reaction to emissions from the said cognitive coexistence radio. Further, the cognitive co-existence radio adapts its internal states to sensed variations in the RF signals transmitted by others in the environment and makes corresponding changes in certain operating parameters (e.g., transmit-power, carrier-frequency, and modulation strategy) in real-time to have a desired effect upon the emitting devices and their corresponding links as well as a desired effect upon its own link. Often, such changes are made with two primary objectives in mind: (1) to provide highly reliable communications whenever and wherever needed; and (2) to provide efficient utilization of the radio spectrum. Networks which include such co-existence cognitive radios are referred to herein as cognitive networks Disclosed embodiments find use in a wide variety of application areas including, but not limited to wireless communication such as that provided by the 4G (LTE) cellular, 802.11 (WiFi), 802.15.4 ("Internet of Things", or IoT), or 802.16 (WiMax) wireless standard and equipment. Since wireless communications with MIMO (multiple input, multiple output) receiver algorithms may be similar mathematically to multiuser detection (MUD) algorithms, disclosed embodiments may be applied to radios that employ MIMO transmission/reception schemes. Furthermore, disclosed embodiments may be applied to systems and techniques for storage on magnetic media (e.g. since magnetic storage readers "see" adjacent tracks in addition to the tracks they are trying to read). This adjacent track interference is mathematically similar to the interference from a "first user on channel" (FUOC) signal. Further still, disclosed embodiments may be applied to signals propagating on a cable (e.g. since receivers closer to a transmitting hub station receive a stronger signal than receivers farther away from the hub station and thus the closer receivers can "see" embedded interfering signal in the presence of the stronger signal that was actually meant for the receivers that are farther away from the transmitting hub.)

While the disclosed subject matter can be used in conjunction with spread spectrum systems, disclosed embodiments allow coexistence without the need for any type of bandwidth-wasting signal spreading, including DSSS.

Disclosed embodiments allow different wireless networks and/or radios to co-exist in the same frequency band at the same time, causing interference with one another (i.e. they will interfere on purpose) without different providers and mobile nodes having to conform to a single waveform or coordination-enabling protocol. The different interfering networks/systems do not require pre-specified coordination/cooperation protocols or means of direct communication with each other to negotiate a satisfactory sharing of the same band.

Disclosed embodiments enable backward compatible operation with radios that do not possess the capabilities of this disclosure, where the older radios would maintain high functionality in the presence of the impeded "spectrum share."

According to one aspect of the present disclosure, a first method for mitigating interference in a channel having multiple users can include: receiving a plurality of signals from a plurality of antenna elements, the received signals comprised of one or more interfering signals and a signal of interest (SOI); for each of the one or more interfering signals, beamforming the received signals to enhance the interfering signal, generating an estimate of the interfering signal, and adjusting the estimated interfering signal to undo the effects of beamforming; and subtracting each of the estimated interfering signals from each of the received signals to generate a plurality of interference-mitigated received signals.

In some embodiments, the first method can include providing the interference-mitigated received signals to a multi-antenna receiver. In some embodiments of the first method, the beamforming to enhance each of the interfering signals can include performing beamforming to enhance at least two of the interfering signals in parallel. In some embodiments of the first method, beamforming the received signals to enhance an interfering signal can include steering a beam in a direction of a transmitter transmitting the interfering signal. In some embodiments of the first method, adjusting an estimated interfering signal to undo the effects of beamforming can include time shifting the estimated interfering signal to account for spatial differences between antenna elements.

According to another aspect of the present disclosure, a second method for mitigating interference in a channel having multiple users can include: receiving a plurality of signals from a plurality of antenna elements, the received signals comprised of one or more interfering signals and a signal of interest (SOI); for each of the one or more interfering signals, beamforming the received signals to enhance the interfering signal, and generating an estimate of the interfering signal; beamforming the received signals to generate a SOI-beam-enhanced received signal; and subtracting each of the estimated interfering signals from the enhanced SOI to generate an interference-mitigated post-beamformed received signal.

In some embodiments, the second method can include providing the interference-mitigated post-beamformed received signal to a demodulator. In some embodiments, the second method can include adjusting the estimated interfering signals to account for the SOI-beam-enhanced received signal. In some embodiments of the second method, the beamforming to enhance each of the interfering signals comprises performing beamforming to enhance at least two of the interfering signals in parallel. In some embodiments of the second method, beamforming the received signals to enhance an interfering signal can include steering a beam in the direction of a transmitter transmitting the interfering signal.

BRIEF DESCRIPTION OF THE DRAWINGS

The manner of making and using the disclosed subject matter may be appreciated by reference to the detailed description in connection with the drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the present disclosure, some introductory concepts and terminology are explained. Communicating data from one location to another requires some form of pathway or medium between the two locations. In telecommunications and computer networking, a communication channel, or more simply "a channel," refers to a connection between two locations over a transmission medium. The connection may, for example, be a logical connection and the transmission medium may be, for example, a multiplexed medium such as a radio channel. A channel is used to convey an information signal, for example a digital bit stream, from one or several sources or sending nodes (or more simply sources or transmitters) to one or several destinations or receiving nodes (or more simply destinations or receivers). Regardless of the particular manner or technique used to establish a channel, each channel has a certain capacity for transmitting information, often measured by its frequency bandwidth in Hz or its data rate in bits per second.

Figure 1:
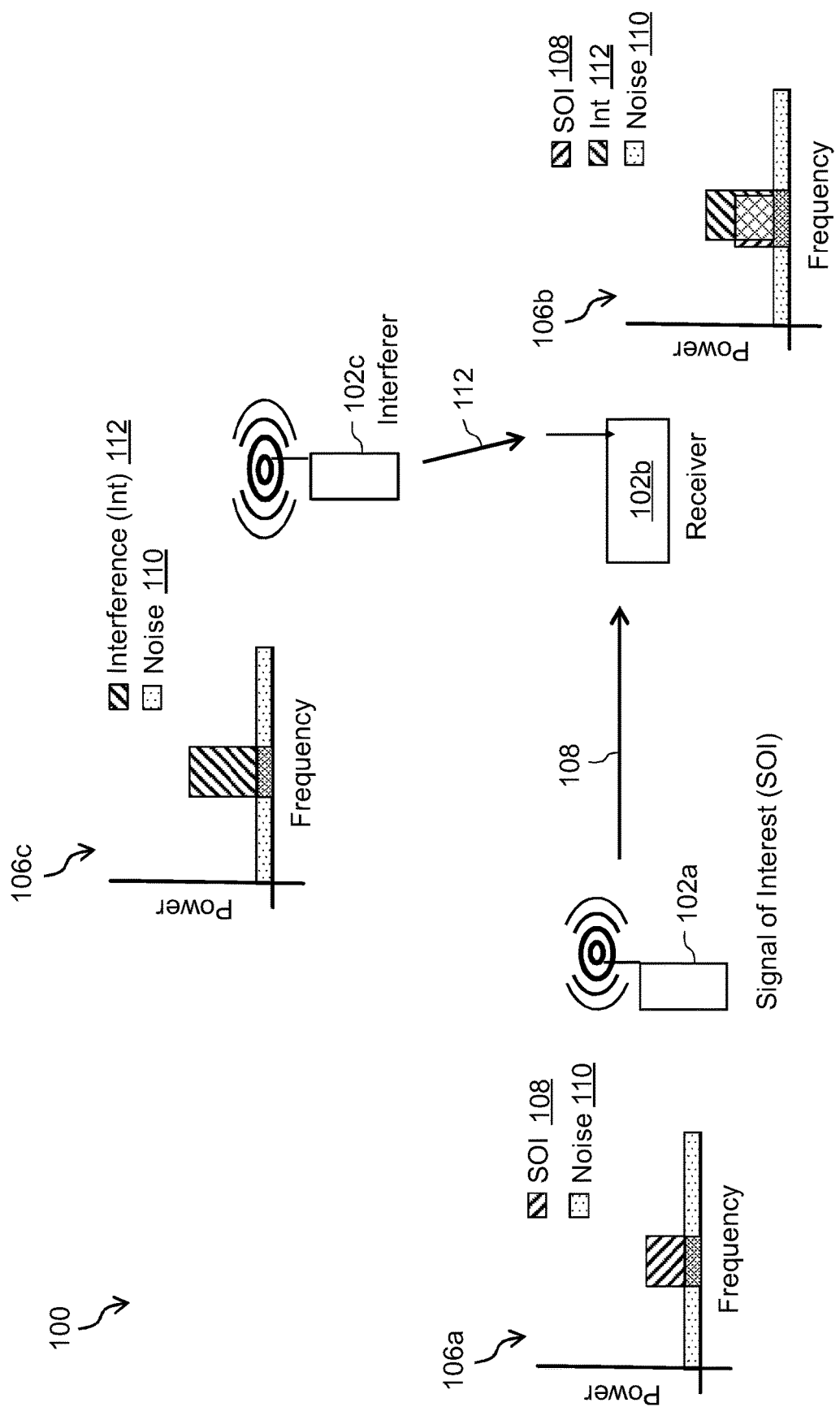
FIG. 1 is a diagram showing a communications environment, or network, in which the disclosed subject matter can be embodied.

Referring to FIG. 1, a communications environment, or network, 100 can include a plurality of radios, or nodes, 102a, 102b, 102c, etc. (102 generally). While only three nodes 102 are shown in FIG. 1 for clarity, the disclosed subject matter can be applied to environments with an arbitrary number of radios.

In the example of FIG. 1, a first radio 102a can transmit a signal of interest (SOI) 108 to a second radio, or receiver, 102b. If there were no other users in the channel, the receiver 102b would see the SOI 108 plus noise 110 generated by the receiver's processing chain, as illustrated by power spectrum 106a. A third radio 102c can transmit an interference signal 112 (i.e., a signal not of interest to receiver 102b), which can be overheard by receiver 102b. If there were no other users in the channel, the receiver 102b would see the interference signal 112 plus noise 110 generated by the receiver's processing chain, as illustrated by power spectrum 106c. When radios 102a and 102c both transmit in the same channel, receiver 102b sees the SOI 108, the interference signal 112, and noise 110 generated by the receiver's processing chain, as illustrated by power spectrum 106b. By definition, interference signal 112 occupies the same channel (or "band"), or at least a portion of the same band, at the same time as SOI 108. In some embodiments, first radio 102a and third radio 102c may intentionally transmit in the same channel. In other embodiments, such channel interference may be unintentional.

In the simplified example of FIG. 1, first radio 102a may be referred to as a "radio of interest" from the perspective of second radio 102b. That is, a "radio of interest" refers to a radio that transmits a SOI. In the case of bidirectional communication, two or more radios can be mutual radios of interest in that they each transmit and receive signals of interest. Mutual radios of interest are sometimes referred to as a "user" of a channel. An interferer transmitting in the same band may be considered a separate user ("interference user") of the channel.

In a conventional radio, interference may be treated as unstructured noise, making it difficult if not impossible for the conventional radio to detect a SOI. However, a MUD receiver can allow for successful communication in the same band as an interferer because a MUD receiver can effectively remove interference caused by the interferer and help the receiver "see through" that interference in order to detect the SOI. Thus, in some embodiments, receiver 102b can include a MUD receiver and, more particularly, a SIC MUD receiver. Disclosed embodiments allow for different radios to operate on the same channel at the same time, allowing users to occupy the same spectrum without having to increase the bandwidth allocation.

Figure 2:
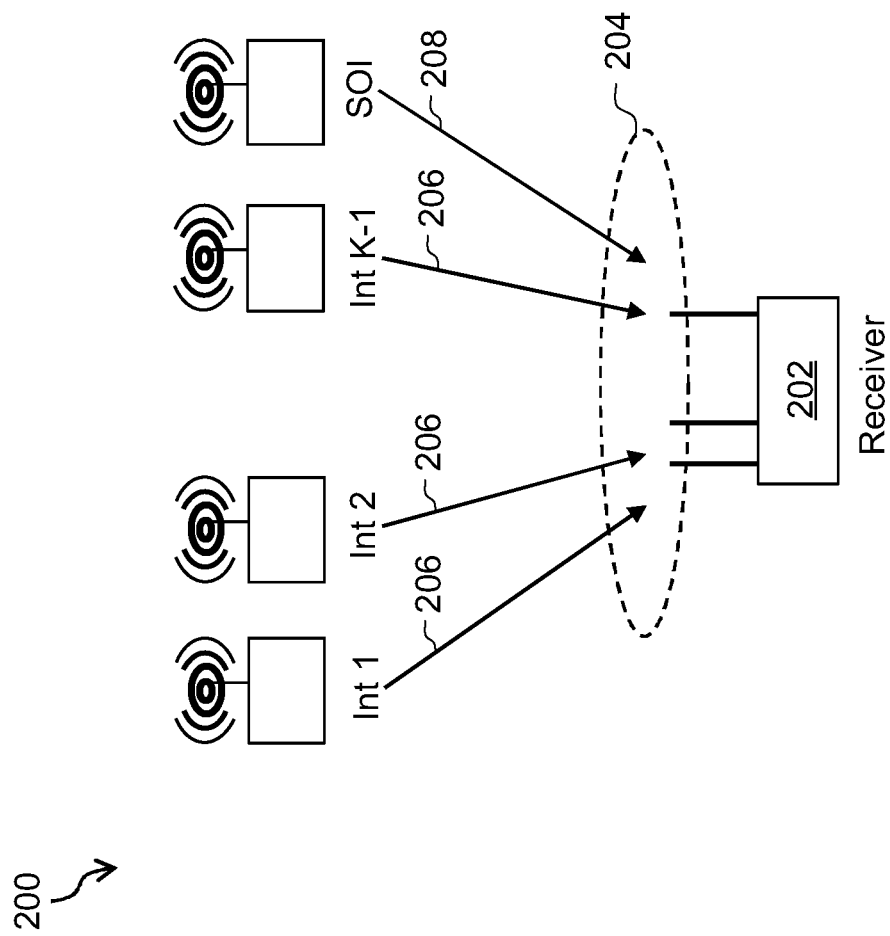
FIG. 2 is a diagram showing a communications environment in which a multi-antenna sequential interference cancellation (SIC) receiver receives a signal comprised of K interfering transmitters.

FIG. 2 shows an illustrative communications environment 200 in which a multi-antenna SIC receiver 202 receives (or "sees") a signal 204 comprised of K signals from K transmitters operating in the same channel. In particular, the received signal 204 can comprise K−1 interference signals 206 and a SOI 208 (for a total of K). The receiver 202 can include multiple antenna elements and use a combination of beamforming and sequential interference cancellation (SIC) to recover the SOI 208 from among the K interfering signals.

Figure 3:
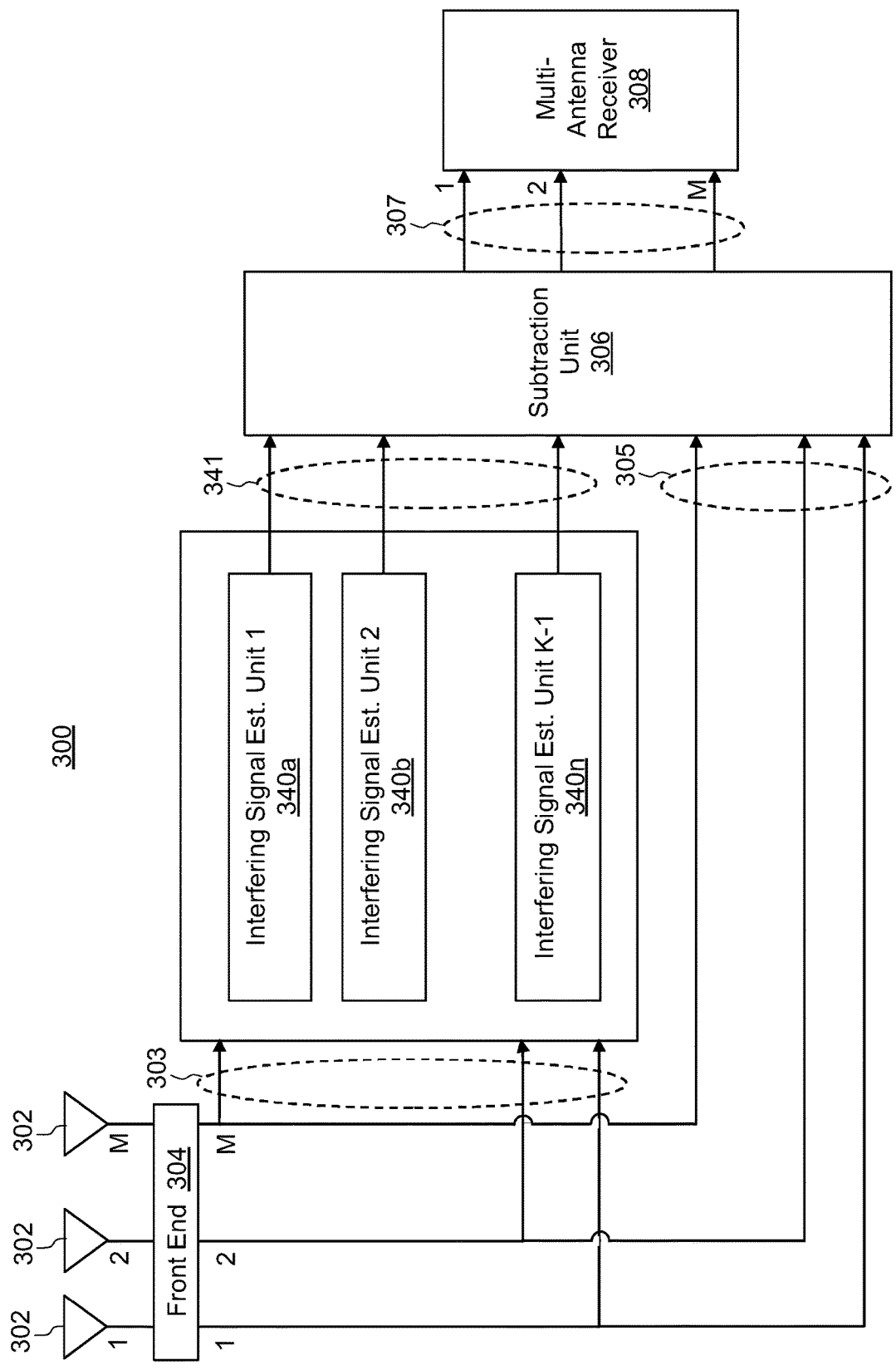
FIG. 3 is a block diagram showing a multi-antenna SIC receiver, according to some embodiments.
Figure 5:
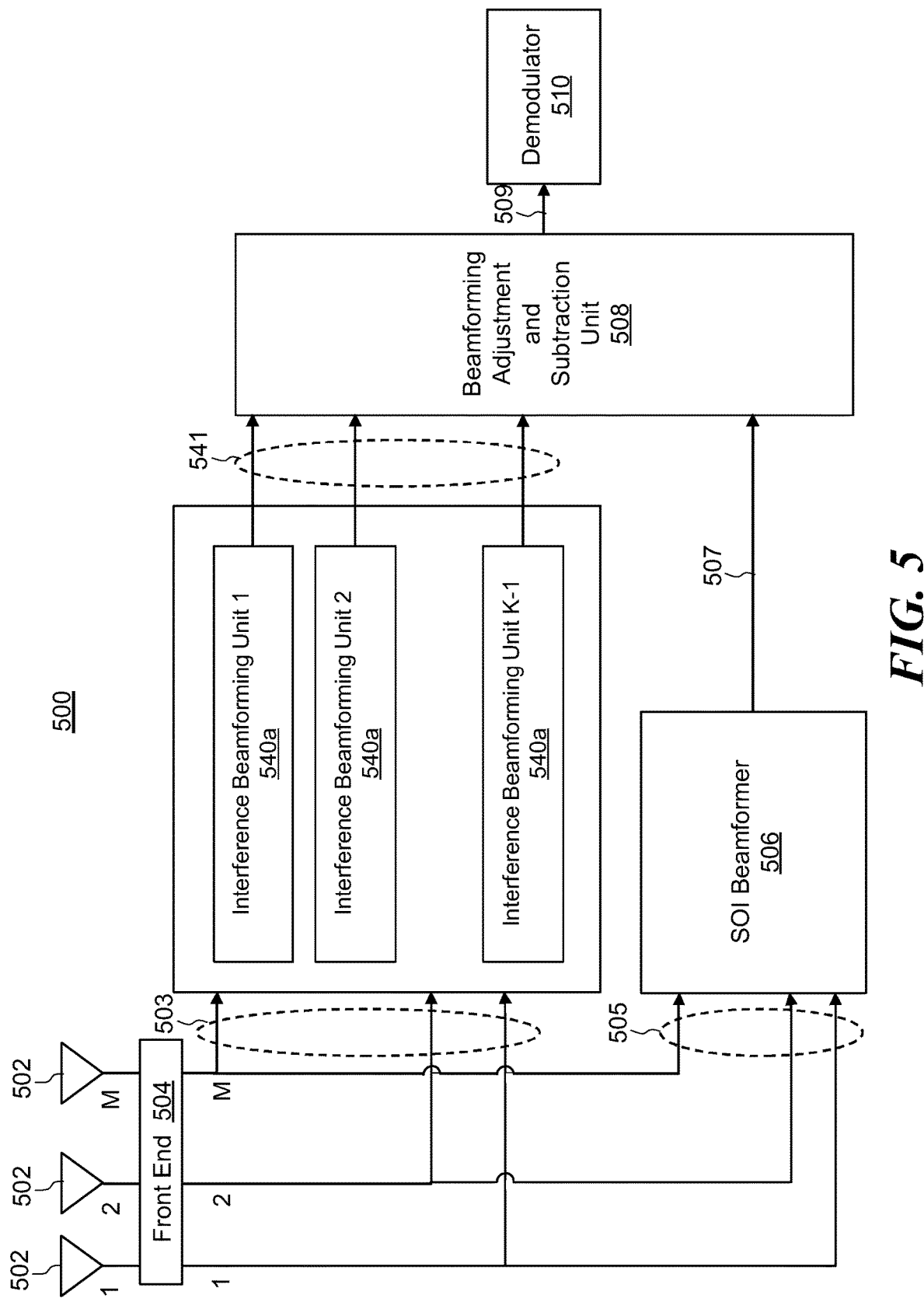
FIG. 5 is a block diagram showing another multi-antenna SIC receiver, according to some embodiments.

As illustrated in FIG. 2, typically there will be spatial diversity among interfering signals. For example, in commercial wireless networks, transmitters can be spread across a large geographic area, meaning that the interfering transmitters to be located at different angles of arrival as seen by a receiver. If a receiver is equipped with multiple antennas, such as receiver 202 of in FIG. 2, the receiver can employ beamforming algorithm to direct a strong beam toward one of the transmitters and, depending upon the number of antennal elements and the relative locations of the different transmitters, might be able to direct nulls toward one or more of the other transmitters. Alternatively, analog beamforming can be used to adjust the received powers of interfering signals. FIG. 3 and FIG. 5 show examples of a multi-antenna SIC receivers that can use a combination of beamforming and SIC to successfully see a SOI 208 from among one or more interference signals 206, according to some embodiments.

Turning to FIG. 3, a multi-antenna SIC receiver 300 can include a plurality (M) of antenna elements 302, a front end unit 304, one or more interfering signal estimation units 340a, 340b, . . . 340n (340 generally), a subtraction unit 306, and a multi-antenna receiver 308. As used herein, the term "unit" refers to a collection of hardware and/or software configured to perform and execute the processes, steps, or other functionality described in conjunction therewith.

In some embodiments, the antenna elements 302 can be provided upon a single antenna array structure. For example, antenna elements 302 can correspond to sensor elements on a phased array structure. In other embodiments, antenna elements 302 can be provided as multiple antenna structures.

The number of interfering signal estimation units (ISEUs) 340 may be selected based on an actual or expected number of interfering signals (i.e., other users) operating in the same channel as the receiver 300. In particular, if there are K users transmitting in the channel, including the receiver, then receiver 300 can include K−1 ISEUs, as shown in FIG. 3. Techniques for estimating the number of interfering signals (K) are known in the art. For example, existing MUD receives employ an up front estimation algorithm that would estimate K, or embed an algorithm in with the MUD, often iteratively, to estimate and then refine the estimate of K, as well as track parameters of the K−1 interfering signals. In some embodiments, an ISEU 340 can be implemented, at least in part, using software and the number of ISEUs 340 within the receiver 300 can be dynamically adjusted by allocating or deallocating corresponding data structures in software, or by invoking a software process embodying ISEUs 340 K−1 times. FIG. 3 shows the received signals being fed into K−1 ISEUs in parallel. In other embodiments, the received signals can be iteratively or sequentially fed into a fewer number of ISEUs, such as a single ISEUs implemented in hardware, such as on a FPGA (field programmable gate array). That is, processing can be done in series so as to reuse the same processing hardware for the different signal estimates. The sequential estimates can be collected (e.g., in memory) and then provided to subtraction unit 306.

The M antenna elements 302 can receive electromagnetic (EM) waves in the receiver's environment. As discussed above in the context of FIG. 2, a received signal can comprise a SOI and one or more (K−1) interference signals. That is, each of the M antenna elements 302 can detect or sense some combination of K interfering signals. The outputs of the M antenna elements 302 may be passed to front end unit 304. Front end unit 304 may include conventional front end radio elements to capture a received RF signal within a particular RF band. In some embodiments, a wideband front end may be used to capture signals within multiple RF bands at the same time. In some embodiments, front end unit 304 may down convert and/or digitize the captured RF signals. Front end unit 304 provides, as output, M received signals, which are passed to ISEUs 340 on signal paths 303 and also passed to subtraction unit 306 on signal paths 305. While a single front end unit 304 is shown in FIG. 3, in other embodiments, the antenna elements 302 can be coupled to multiple different front end units 304.

A signal path shown in the figures may correspond to a physical wire. Alternatively, in the case wherein the disclosed structures and techniques are implemented within software (e.g., as a VHDL, or Very High Speed Integrated Circuit Hardware Description Language, software program) the signal paths may represent the output of one processing block/module being stored and the read into another block/module. For convenience, a signal carried on a particular signal will be referred to herein using the reference number for that path used in the drawings.

Figure 3A:
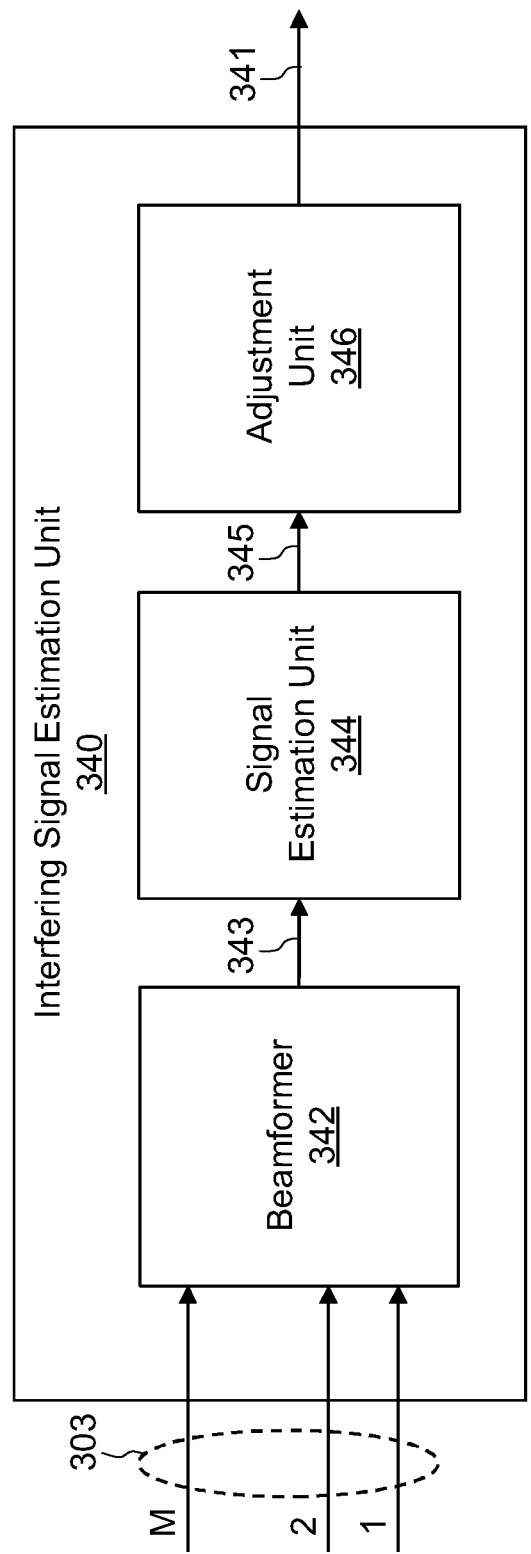
FIG. 3A is a block diagram showing an interfering signal estimation unit that can be provided within the receiver of FIG. 3, according to some embodiments.

As shown in FIG. 3A, an ISEU 340 can include a beamformer 342, a signal estimation unit 344, and an adjustment unit 346, according to some embodiments. Beamformer 342 can receive, as input, the M received signals 303. Thus, while not apparent in FIG. 3 alone, it can now be appreciated that each of the K−1 ISEUs 340 can receive, as input, each of the M received signals 303.

Beamformer 342 can receive the M received signals 303 and use a beamforming technique to enhance a particular one of the K−1 interfering signals. For example, as shown in FIG. 3, a beamformer within a first ISEU 340a can be configured to enhance a first interfering signal, the beamformer within a second ISEU 340b can be configured to enhance a second interfering signal, etc., and the beamformer within the (K−1)$^{th}$ ISEU 340n can be configured to enhance the (K−1)$^{th}$ interfering signal. Notably, in the embodiment of FIG. 3, the SOI is not enhanced using beamforming. Beamforming can include steering a beam in the direction of the interferer's transmitter. The direction of the interfering transmitters can be determined using known techniques. For example, rough estimates of the interfering transmitter directions can be obtained as part of the process of identifying the number of interfering transmitters. More accurate estimates can be obtained using an adaptive beamforming or adaptive nulling algorithm that is capable of increasing the SINR (signal-to-interference-plus-noise ratio) for any signal of interest (here, that SOI would be the interfering signal) would be suitable for use. In some embodiments, multiple beamforming algorithms can be implemented within a receiver 300 and configured such that they can be employed under certain conditions that might exist. For example, one beamforming algorithm that uses signal parameter estimation may be well suited for enhancing a particular interfering signal, whereas another algorithm that uses adaptive beamforming (without needing signal parameter estimation) may be suitable for enhancing a different interfering signal. In some embodiments, a beamforming algorithm that enhances an interfering signal at least 6 dB higher than the combination of the other signals can be used. In some embodiments, a combination of K-estimating algorithms (estimate how many signals are being received in a given beam) and a course signal parameter estimation algorithm for those signals that were detected in that beam, combined with adaptive beamforming, can be used. The beamformer 342 can output the enhanced interfering signal on path 343. Beamformer 342 can be provided as an analog, digital, or hybrid beamformer.

Signal estimation unit 344 can receive and process the enhanced interfering signal 343 to generate an estimate of the interfering signal as output on path 345. Signals 343 and 345 can also include the antenna weights that were applied by beamformer 342 so that adjustment unit 346, discussed below, can "undo" the weights to create a signal estimate to correspond to each of the antenna elements. Signal estimation unit 344 can estimate one or more parameters of the enhanced interfering signal 343. Such signal parameters may include, for example, received signal power, received signal modulation type (e.g. QPSK), error correction coding type, code rate, received signal signature pulse, timing offset relative to reference, received phase offset relative to reference, baud rate and/or symbol duration, channel transfer function and/or multipath characterization of channel. In the case where the enhanced interfering signal 343 is a modulated carrier signal, signal estimation unit 344 can demodulate the signal's symbols. Using the estimated signal parameters and/or the demodulated signal symbols, signal estimation unit 344 can generate an estimate of the target interfering signal (i.e., the interfering signal for which the corresponding beamformer 342 was configured to enhance).

While any suitable or known technique can be used to estimate the interfering signal, a brief explanation of one technique is provided here. The interfering signal can be recreated using an estimated symbol stream and an estimated symbol pulse shape filter to create a "modulated signal" but with the "pulse" shape changed to match what the channel might have done to the pulse (e.g., by using a channel transfer function). Then, a carrier signal can be applied so that the phase and symbol timing match those that were estimated to be the case in the received signal. Next, a gain or attenuation can be applied to better match the estimated signal to the actual received signal (as is was seen in the beam-pointed receiver).

The output 345 of the signal estimation unit 344 is an estimate of the "post-beamformed" interfering signal, meaning that the estimated interfering signal 345 may be time shifted or otherwise altered by the beamformer 342. Output 345 can also include the antenna weights used by beamformer 342 to create the beam. In some embodiments, the estimated signal parameters can also be provided as output 345.

Adjustment unit 346 can adjust M copies of the interfering signal estimate 345 to account for the beamforming operation, i.e., to undo any effects of beamforming. Adjustment unit 346 can receive, via path 345, the antenna weights used by beamformer 342 to perform such adjustments. Adjust unit 346 can undo the effects of beamform by, for example, adjusting amplitude to match that which would be seen by a single antenna instead of a pointed beam as well as time shifting the signal to account for spatial differences between antenna elements 302. In some embodiments, adjustment unit 346 can use estimate signal parameters provided by unit 344 to undo the effects of beamforming. The set of M adjusted signals, provided as output of ISEU 340 on path 341, are M estimates of the "pre-beamformed" interfering signal, meaning they are estimates of the interfering signal as they would be seen by the corresponding M antenna elements 302 if there were no other interfering signals or SOI present.

Turning back to FIG. 3, each of the K−1 ISEUs 340 can provide, as output, a set of M estimates of a "pre-beamformed" interfering signal, one for each of the M antenna elements. For example, first ISEU 340a can output an estimate of the first interfering signal, second ISEU 340b can output an estimate of the second interfering signal, etc., and the (K−1)$^{th}$ ISEU 340n can output an estimate of the (K−1)$^{th}$ interfering signal. As shown, the K−1 interfering signal estimates 341 may be provided as input to the subtraction unit 306, along with the M received signals 305.

Subtraction unit 306 is configured to subtract off each of the K−1 sets of M pre-beamformed interfering signal estimates 341 from each of the M received signals 305 (i.e., the outputs of the multiple antenna elements 302 by way of front end unit 304) to reveal the SOI underneath. The output of subtraction unit 306 is M interference-mitigated (or "cleaned up") receive signals 307, corresponding to the signals received from the M antenna elements 302 but without at least some (and ideally without any) contribution of K−1 interfering signals.

The interference-mitigated receive signals 307 can then be provided to a conventional multi-antenna receiver 308. For example, multi-antenna receiver 308 can perform beamforming or adaptive nulling on the M received signals, but with some (and ideally all) interference removed from each signal.

In some embodiments, conventional beamforming or adaptive nulling structures and techniques can be used in combination with the illustrative receiver 300. For example, receiver 308 can be provided as a beamforming- and/or adaptive nulling-capable receiver. If one or more of the interfering signals cannot be removed by the structures and techniques disclosed herein (e.g., because there is insufficient information available to estimate the interfering signals or the interfering signals use an unknown modulation scheme), then conventional beamforming or adaptive nulling techniques and structures can be used to remove or lessen these remaining interfering signals. In some embodiments, an ISEU 340 may determining that it is unable to estimate an interfering signal with sufficient accuracy and, upon determining this, may not pass on any estimate to subtraction unit 306 and instead allow a beamformer-enabled receiver 308 to handle that particular interfering signal.

It is appreciated that, in the multi-antenna SIC receiver embodiment of FIG. 3, the SIC operates to subtract interference "in antenna space." That is spatial degrees of freedom are used to enhance the estimates of the unwanted signals so that they can be subtracted at each antenna element, leaving the SOI and as few, if any, unwanted, interfering signals for each antenna element.

Figure 4:
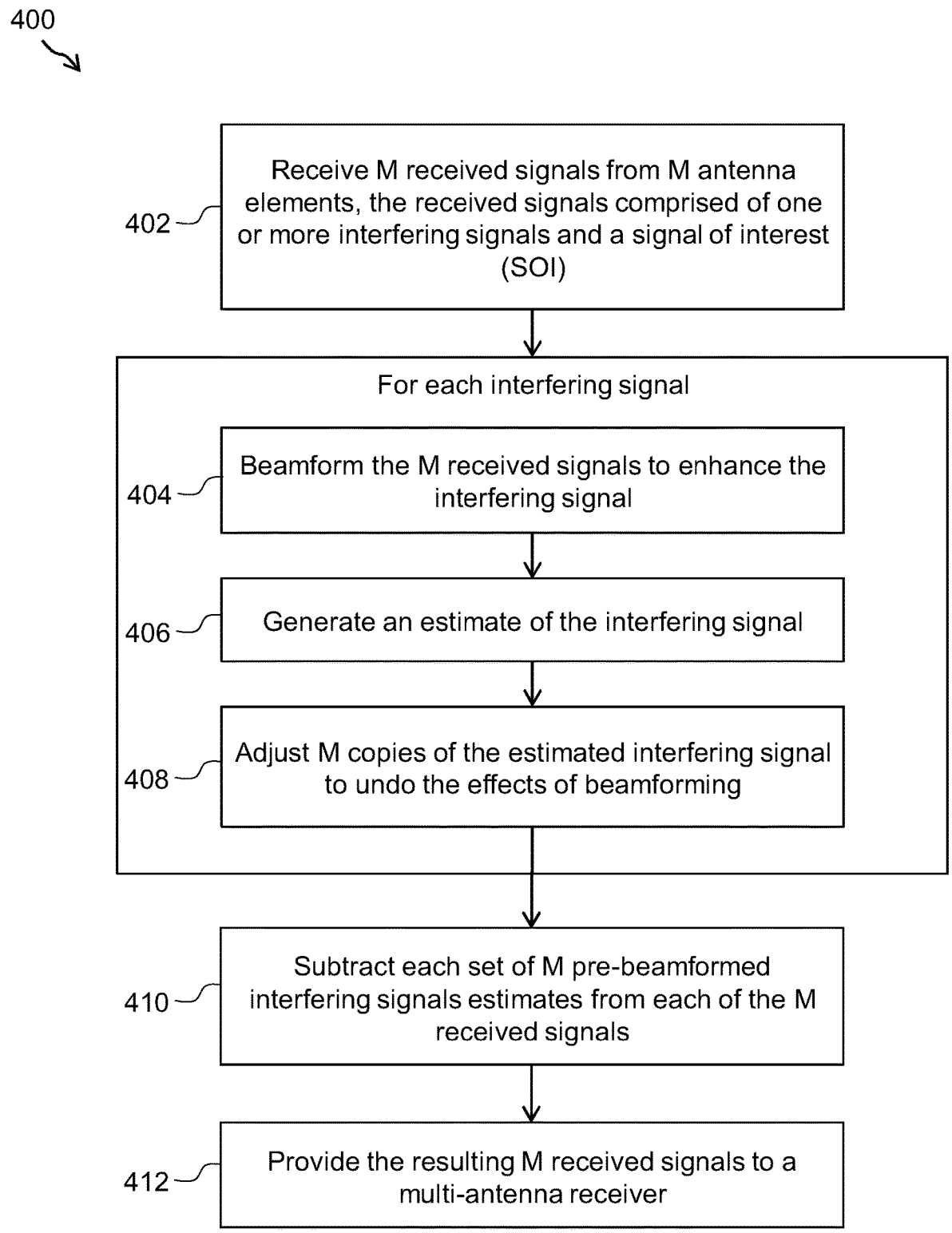
FIG. 4 is a flow diagram showing an illustrative process that can be implemented within the receiver of FIG. 3, according to some embodiments.

FIG. 4 shows an illustrative process 400 that can be implemented within a multi-antenna SIC receiver, such as receiver 300 of FIG. 3, according to some embodiments.

At block 402, M received signals can be received from M respective antenna elements. Each of the M received signals can comprise of one or more interfering signals and a signal of interest (SOI). In some embodiments, the signals may be captured and/or digitized by front end radio elements. For each of the interfering signals, blocks 404, 406, and 408 may be performed. The estimation of multiple interfering signals can be performed in parallel or sequentially.

At block 404, the M received signals can be beamformed to enhance the particular interfering signal. That is, a beamformer can be configured to enhance the interfering signal based on spatial diversity that may exist between the interfering signals and/or the SOI. Techniques for configuring and using a beamformer to enhance a particular interfering signal are described above in the context of FIG. 3.

At block 406, an estimate of the interfering signal can be generated from the enhanced signal. In some embodiments, this can include estimating one or more parameters of the enhanced interfering signal and/or demodulating the signal's symbols. The estimated signal parameters and/or the demodulated signal symbols can then be used to estimate the interfering signal using, for example, techniques described above in the context of FIG. 3.

At block 408, estimated interfering signal can be adjusted to undo the effects of beamforming. This can include, for example, amplitude adjustment to account for reception by a single antenna element and time shifting the signal to account for spatial differences between antenna elements and other techniques described above in the context of FIG. 3. The output of block 408 can include a set of M estimates of the "pre-beamformed" interfering signal, one corresponding to each of the M antenna elements. For K−1 interfering signals, K−1 sets of M pre-beamformed interfering signal estimates can be provided to block 410.

At block 410, each set of M pre-beamformed interfering signals estimates can be subtracted from each of the M received signals 305 (i.e., the outputs of the multiple antenna elements 302 by way of front end unit 304) to reveal the SOI underneath. The result of block 410 is M interference-mitigated (or "cleaned up") received signals corresponding to the signals received from the M antenna elements 302. At block 412, the interference-mitigated received signals can be provided to a conventional multi-antenna receiver, such as shown and described above in the context of FIG. 3.

FIG. 5 shows another multi-antenna SIC receiver 500, according to some embodiments. The illustrative receiver 500 can include a plurality (M) of antenna elements 502, a front end unit 504, one or more interfering beamforming units (IBUs) 540a, 540b, . . . 540n (540 generally), a signal of interest (SOI) beamformer 506, a beamforming adjustment and subtraction unit 508, and a demodulator 510. Antenna elements 502 and front end unit 504 be the same as or similar to antenna elements 302 and front end unit 304 of FIG. 3. The M received signals (i.e., the output of front end unit 504) are passed to IBUs 540 on signal paths 503 and to SOI beamformer 506 on signal paths 505. The IBUs 540 of FIG. 5 can be arranged and employed in a similar manner to ISEUs 340 of FIG. 3.

Figure 5A:
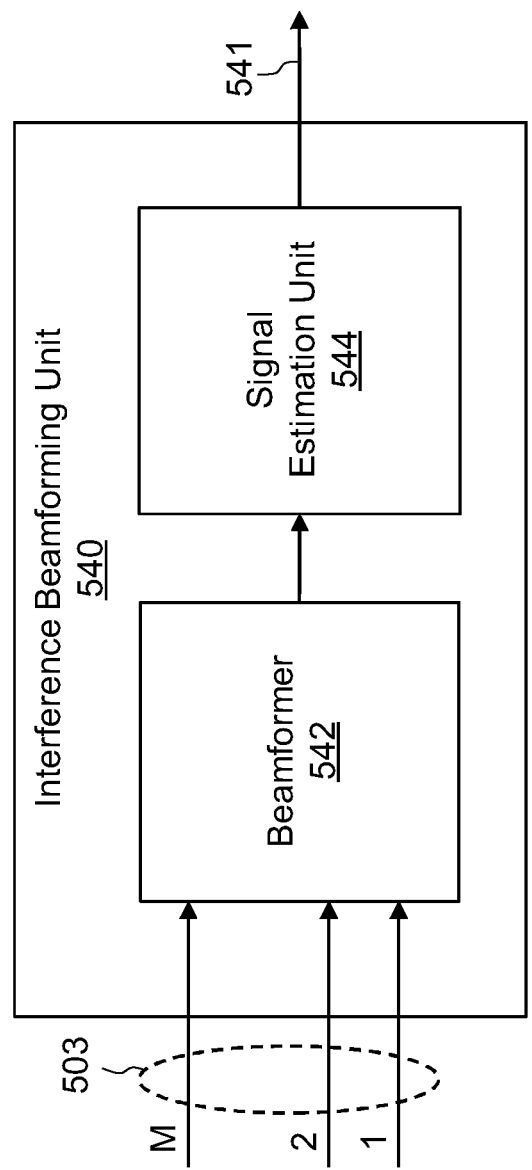
FIG. 5A is a block diagram showing an interference beamformer unit that can be provided within the receiver of FIG. 5, according to some embodiments.

As shown in FIG. 5A, an IBU 540 can include a beamformer 542 and a signal estimation unit 544, which can be the same as or similar to beamformer 342 and signal estimation unit 344 detailed above in the context of FIG. 3A. In contrast to the ISEU 350 of FIG. 3A, an IBU 540 does not adjust its output to undo the effects of beamforming. Rather, the output 541 of IBU 540 is a "post-beamformed" estimate of the interfering signal and its parameters.

Turning back to FIG. 5, the SOI beamformer 506 can use a beamforming technique to enhance the SOI (i.e., the K$^{th}$ signal in the channel). For example, SOI beamformer 506 can steer a beam in the direction of the SOI's transmitter. The SOI transmitter direction can be determined using techniques previously discussed. In some embodiments, the SOI transmitter direction can be determined using an adaptive beamforming algorithm to enhance the SOI signal. In some embodiments, a SOI training sequence or a pilot tone can be used to hone in on the SOI transmitter. SOI beamformer 506 can output the enhanced SOI on signal path 507 along with the corresponding antenna weights used to form the beam.

As shown, the K−1 interfering signal estimates 541 and corresponding beamformer antenna weights may be provided as input to the beamform adjustment and subtraction unit 508, along with the enhanced SOI-beam-enhanced received signal 507 and its corresponding antenna weights. Unit 508 can adjust the interfering signal estimates 541 to account for the SOI-enhancing beamforming operation (i.e., the operation of beamformer 506) such that each of these interfering signals is adjusted to reflect what they would have been if they were to be received by the SOI-enhancing beam. Unit 508 can then subtract each of the interfering signal estimates 541 from the SOI-beam-enhanced received signal 507 to produce, as output, an interference-mitigated post-beamformed received signal 509. The interference-mitigated post-beamformed received signal 509 may then be processed by a conventional demodulator, such as demodulator 510.

It is appreciated that, in the multi-antenna SIC receiver embodiment of FIG. 5, the SIC operates to subtract interference "in post-beam space." That is, the receiver directly subtracts the "post-beamformed" interfering signals estimates from a single output SOI-beamformer-enhanced received signal to produce a single output cleaned up signal containing the SOI and fewer, less or no interfering signals.

Figure 6:
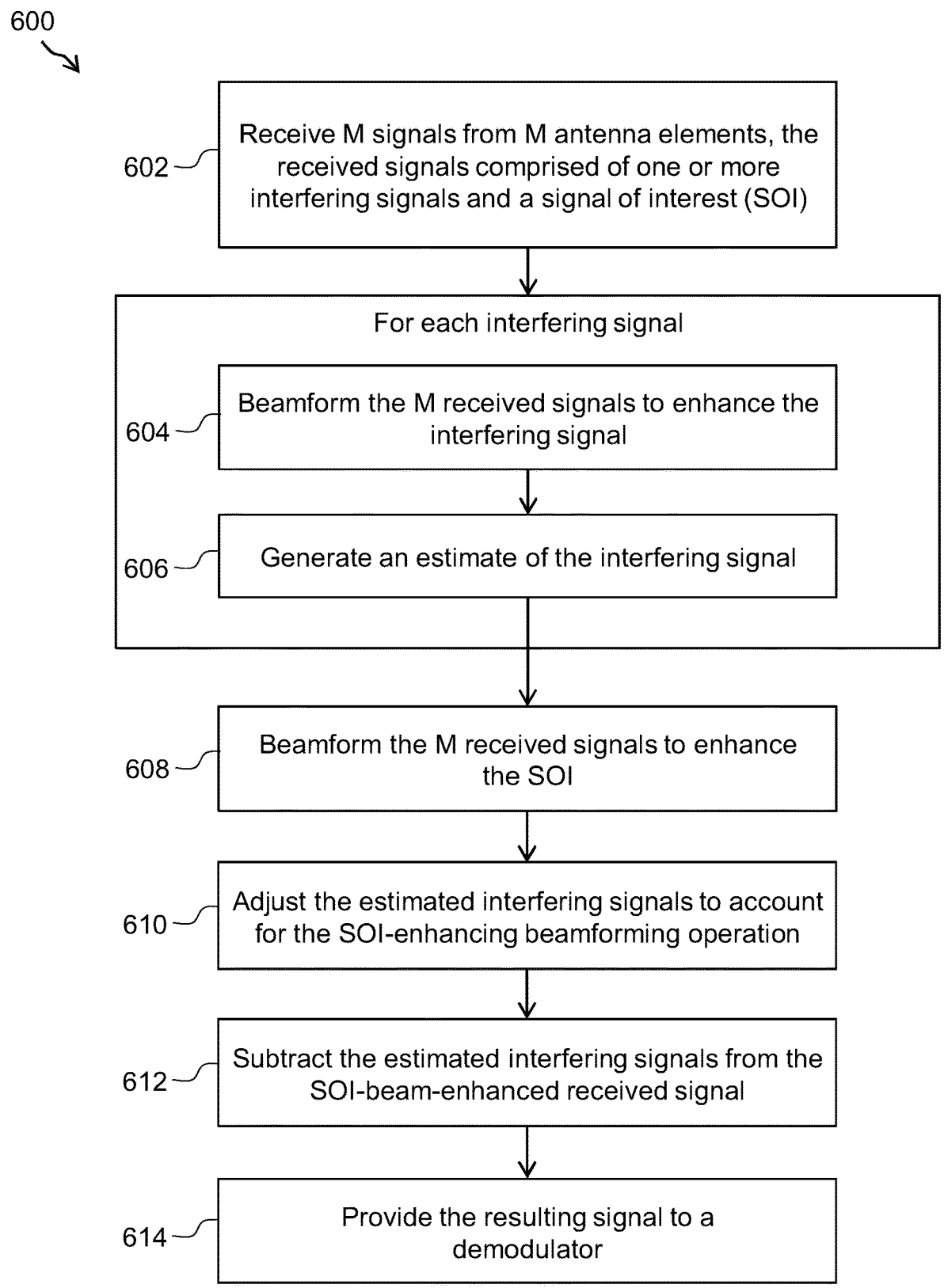
FIG. 6 is a flow diagram showing an illustrative process that can be implemented within the receiver of FIG. 5, according to some embodiments.

FIG. 6 shows an illustrative process 600 that can be implemented within a multi-antenna SIC receiver, such as receiver 500 of FIG. 5, according to some embodiments.

At block 602, M signals can be received from M respective antenna elements. Each of the received signals can comprise of one or more interfering signals and a signal of interest (SOI). In some embodiments, the signals may be captured and/or digitized by front end radio elements. For each of the interfering signals, blocks 604 and 606 may be performed. The estimating of multiple interfering signals can be performed in parallel or sequentially.

At block 604, the M received signals can be beamformed to enhance the particular interfering signal. At block 606, an estimate of the interfering signal can be generated from the enhanced signal. Techniques for configuring and using a beamformer to enhance a particular interfering signal and estimating an interfering signal therefrom are described above in the context of FIG. 3.

At block 608, the M received signals can be beamformed to enhance the SOI the received signal (i.e., to generate a SOI-beam-enhanced received signal). At block 610, the estimated interference signals can be adjusted to account for the SOI-enhancing beamforming operation. Techniques for adjusting the estimated interference signals to account for an enhanced SOI are described above in the context of FIG. 5. At block 612, each of the estimated interference signals can be subtracted from the SOI-beam-enhanced received signal to provide an interference-mitigated post-beamformed received signal (ideally containing a strong SOI and few or none of the interfering signals), which can in turn be provided to a conventional demodulator (block 614).

Embodiments described herein may be used advantageously in at least the following exemplary commercial settings.

Example 1: Co-channel interference-tolerable cognitive radio spectrum licensing. The FCC could allocate spectrum for adapt-only and smart-adapting (e.g. cognitive) radios. As radio frequency (RF) spectrum tends toward being completely occupied, the radios in each band are allowed and encouraged to "work out", on the fly, jointly agreeable situations in which interference is tolerated and useful communication continues. There is no requirement for radios to adhere to the same specification or be built to "talk with" one another to bring about the feasible co-existence. This is also no requirement for a controller that can "talk" to all systems that wish to use this band to help work out the terms co-existence.

Example 2: LTE-Advanced. The current critical need is to have self-deployed, self-configurable, loosely-controlled networks that are backward compatible with existing LTE systems. LTE-advanced will allow individuals to stand up their own LTE femto-cell without the need for a centralized provider. This can lead to many problems if done incorrectly, so non-provider deployed LTE networks need to be self-configuring. Also, the spectrum is already suffering from being too full.

Example 3: Embodiments also allow an increased number of users in cellular systems. This technology allows lower power femto-cells to coexist on channels in use by macro-cells, servicing additional user by more densely using resources already owned by cellular network operators. Deployment in handsets, that do not have the physical size or weight to support more than two antennas, would allow for higher frequency reuse due to automatic mitigation of interference, and enhances the performance that would be possible using only two antenna elements in a traditional manner, such as adaptive beamforming alone. This technology also enables service in stadiums and other venues in which there are thousands of users in close proximity. This technology does not require a large antenna array, unlike other technologies.

Example 4: Home networking. The density of home wireless technologies may be increased through application of radios that automatically co-exist with legacy equipment. This is particularly useful in dormitories and apartment buildings where many different WiFi access points exist in close proximity.

Disclosed embodiments may be implemented in any of a variety of different forms. For example, disclosed embodiments can be implemented within various forms of communication devices, both wired and wireless, such as television sets, set top boxes, audio/video devices, smartphones, laptop computers, desktop computers, tablet computers, satellite communicators, cameras having communication capability, network interface cards (NICs) and other network interface structures, base stations, access points, and modems.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method for mitigating interference in a channel having multiple users, the method comprising:
   receiving a plurality of signals from a plurality of antenna elements, the received signals comprised of one or more interfering signals and a signal of interest (SOI);
   for each of the one or more interfering signals:
      beamforming the received signals to enhance the interfering signal over the SOI,
      generating an estimate of the interfering signal, and
      adjusting the estimated interfering signal to undo the effects of beamforming; and
   subtracting each of the estimated interfering signals from each of the received signals to generate a plurality of interference-mitigated received signals.

2. The method of claim 1, comprising:
   providing the interference-mitigated received signals to a multi-antenna receiver.

3. The method of claim 1, wherein the beamforming to enhance each of the interfering signals comprises performing beamforming to enhance at least two of the interfering signals in parallel.

4. The method of claim 1, wherein beamforming the received signals to enhance an interfering signal comprises:
   steering a beam in a direction of a transmitter transmitting the interfering signal.

5. The method of claim 1, wherein adjusting an estimated interfering signal to undo the effects of beamforming comprises:
   time shifting the estimated interfering signal to account for spatial differences between antenna elements.

6. A method for mitigating interference in a channel having multiple users, the method comprising:
   receiving a plurality of signals from a plurality of antenna elements, the received signals comprised of one or more interfering signals and a signal of interest (SOI);
   for each of the one or more interfering signals:
      beamforming the received signals to enhance the interfering signal over the SOI, and
      generating an estimate of the interfering signal;
   beamforming the received signals to generate a SOI-beam-enhanced received signal; and
   subtracting each of the estimated interfering signals from the enhanced SOI to generate an interference-mitigated post-beamformed received signal.

7. The method of claim 6, comprising:
   providing the interference-mitigated post-beamformed received signal to a demodulator.

8. The method of claim 6, comprising:
   adjusting the estimated interfering signals to account for the SOI-beam-enhanced received signal.

9. The method of claim 6, wherein the beamforming to enhance each of the interfering signals comprises performing beamforming to enhance at least two of the interfering signals in parallel.

10. The method of claim 6, wherein beamforming the received signals to enhance an interfering signal comprises:
    steering a beam in the direction of a transmitter transmitting the interfering signal.

* * * * *